No. 784,398. PATENTED MAR. 7, 1905.
W. HECKELER.
ARTIFICIAL FISHING BAIT.
APPLICATION FILED JUNE 11, 1904.
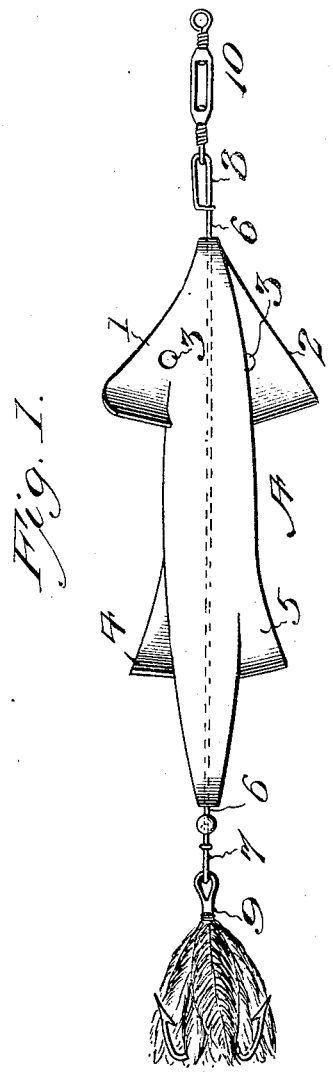
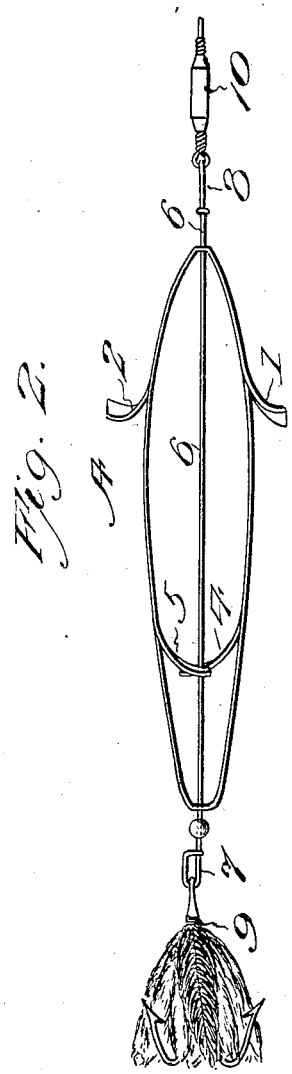
Witnesses
Wm J Koerth.
A. G. Heylmun
Inventor
Wm. Heckeler,
By Victor J. Evans
Attorney No. 784,398. Patented March 7, 1905.

UNITED STATES PATENT OFFICE.

WILLIAM HECKELER, OF MEADVILLE, PENNSYLVANIA.

ARTIFICIAL FISHING-BAIT.

SPECIFICATION forming part of Letters Patent No. 784,398, dated March 7, 1905.

Application filed June 11, 1904. Serial No. 212,172.

*To all whom it may concern:*

Be it known that I, WILLIAM HECKELER, a citizen of the United States, residing at Meadville, in the county of Crawford and State of Pennsylvania, have invented new and useful Improvements in Artificial Fishing-Baits, of which the following is a specification.

My invention relates to improvements in fishing implements of the kind denominated "artificial bait;" and the object is to simplify and improve the existing art.

My invention embodies a piece of suitable sheet metal shaped into two sections or plates formed to the general outlines of a fish and then folded to make an elliptically-shaped body and the free ends cemented or otherwise secured together, the bodies of the plates being formed at the front portions with outwardly-turned fins or wings and at the rear portions with inwardly-turned fins or wings, the fins in each instance extending beyond the contour-lines of the plates, and a rod or bar on which the bait is revolubly mounted, all as will be fully specified and distinctly claimed.

I have fully and clearly illustrated my improvements in the annexed drawings, to be taken as a part of this specification.

Reference being had to the drawings, Figure 1 is a side elevation in perspective of the complete device, showing the hooks connected thereto and means for fastening the device to a line. Fig. 2 is a plan view of the complete device.

Referring to the drawings, A designates the body of the bait, which is formed from a single sheet-metal blank stamped or otherwise shaped to produce a pair of connected sections or plates having the general contour of a fish, as illustrated in Fig. 1 of the drawings. The sheet-metal blank after being properly formed is folded at a point between the connected sections, and the latter are bent relatively and conjointly to present a body of substantially-elliptical shape in longitudinal section, as seen in Fig. 2 of the drawings. A pair of oppositely-disposed front fins or wings 1 2 are provided, respectively, on the sections, and these fins are curved outwardly and inclined toward the tail of the bait from the upper edge of the fin, as indicated in the drawings. This construction and formation insures the continuous revolution of the bait when drawn forward through the water. The outer lines of the fins 1 2 are continued into the nose of the bait, as shown, and in the base of the fins are made apertures 3, which are intended to be imitations of the eyes of a fish. In coursing through the water these eyes give the bait the appearance of having eyes positioned in it. Formed on the plates or sections at the rear portion are two other fins extending in opposite directions from the edges of the sections and are curved inward, as shown in Fig. 2 of the drawings, and are inclined in cross-section toward the tail of the bait, as seen. These rear fins give additional velocity to the revolutions of the fish as it is drawn through the water and tend to balance it in its course. The inner edges of the curved-in fins 4 5 extend, respectively, within the path of the outer edge of the opposite plate, so that should a strong-mouthed fish spring the sides inward the ends of the fins will engage the plates and prevent the sides from completely collapsing. However, should the sides become bent or dented they can be easily repaired by pressure applied to their inner faces at the proper place. The bait thus made up and completed is revolubly mounted on a rod 6, extending centrally through the bait, as shown in the drawings, the rod being formed with suitable loops at each end, as 7 8, to the first of which is hung the hook 9 and to the latter is connected a swivel 10 to connect the bait to a line.

The use of the bait is apparent to all genial fishermen. It is simply pulled or trolled through the water, and the resistance of the water rapidly revolves the bait and makes it assume the appearance of a fish. The appearance of the bait when active in the water is very alluring to all kinds of fish which are sought for by this kind of bait.

Having thus described my invention, what I claim, and desire to secure by Letters Patent, is—

1. An artificial fishing-bait formed from a single blank shaped to produce a pair of connected sections each having the general contour of a fish, said blank being folded at a point between the sections, and the latter bent relatively to conjointly present a body of substantially elliptical form in longitudinal section, a pair of oppositely-extending front fins provided respectively on the sections, said fins having their outer longitudinal edges inclined forwardly and inwardly and their rear ends curved outwardly, a pair of oppositely-extending rear fins provided respectively on the sections and having their outer longitudinal edges inclined forwardly and inwardly, a rod extending longitudinally through the body and on which the latter is rotatably mounted, and a hook operatively connected with the bait.

2. An artificial fishing-bait formed of a single blank shaped to produce a pair of connected sections each having the general contour of a fish, said blank being folded at a point between the sections, and the latter bent relatively to conjointly present a body of substantially elliptical form in longitudinal section, and the said body-sections having their initially free ends united, a pair of front fins provided respectively on the sections and having their rear ends curved outwardly, a pair of rear fins provided respectively on the sections each having their rear ends curved inwardly and disposed each in the path of the opposite section, a rod extending longitudinally through the body and on which the latter is rotatably mounted, and a hook operatively connected with the bait.

3. An artificial fishing-bait composed of a single blank shaped to produce a pair of connected sections each having the general contour of a fish, said blank being folded at a point between the sections and the latter bent relatively to conjointly present a body of substantially elliptical form in longitudinal section, a pair of front fins provided respectively on the sections and having their rear ends curved outwardly, a pair of rear fins provided respectively on the sections and having their rear ends curved inwardly, a rod extending longitudinally through the body and on which the latter is rotatably mounted, and a hook operatively connected with and carried by the bait.

In testimony whereof I affix my signature in presence of two witnesses.

WILLIAM HECKELER.

Witnesses:
JOSEPH H. DICKSON,
RICHARD D. BACON.